US010088832B2

(12) United States Patent
Tanigawa et al.

(10) Patent No.: US 10,088,832 B2
(45) Date of Patent: Oct. 2, 2018

(54) METHOD OF GENERATING TOOL PATH BY MODIFYING EXISTING TOOL PATH AND DEVICE PRACTICING THE SAME

(71) Applicant: MAKINO MILLING MACHINE CO., LTD., Tokyo (JP)

(72) Inventors: Yuki Tanigawa, Tokyo (JP); Yuji Otomo, Tokyo (JP); Soichiro Asami, Tokyo (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 263 days.

(21) Appl. No.: 15/021,633

(22) PCT Filed: Sep. 13, 2013

(86) PCT No.: PCT/JP2013/074921
§ 371 (c)(1),
(2) Date: Mar. 11, 2016

(87) PCT Pub. No.: WO2015/037150
PCT Pub. Date: Mar. 19, 2015

(65) Prior Publication Data
US 2016/0224015 A1 Aug. 4, 2016

(51) Int. Cl.
*G05B 19/18* (2006.01)
*G05B 19/4097* (2006.01)
(52) U.S. Cl.
CPC ........... *G05B 19/4097* (2013.01); *G05B 2219/35097* (2013.01); *G05B 2219/36266* (2013.01)
(58) Field of Classification Search
CPC ...... G05B 19/4097; G05B 2219/35097; G05B 2219/36266
(Continued)

(56) References Cited

U.S. PATENT DOCUMENTS 4,713,747 A * 12/1987 Niwa .................. G05B 19/4166
700/180
5,014,209 A * 5/1991 Nankaku .......... G05B 19/40938
318/572
(Continued)

FOREIGN PATENT DOCUMENTS

JP 2-132503 5/1990
JP 2-260007 10/1990
(Continued)

OTHER PUBLICATIONS

International Search Report dated Nov. 26, 2013, directed to International Application No. PCT/JP2013/074921, 2 pages.

*Primary Examiner* — Chun Cao
(74) *Attorney, Agent, or Firm* — Morrison & Foerster LLP

(57) ABSTRACT

A tool path generating device for generating a machining program is provided with a determining unit which determines whether or not the effective cutting length of a tool would be insufficient if machining were performed using a first tool path, and an estimating unit which estimates a section of insufficiency, being the section in which the effective cutting length of the tool is insufficient. The tool path generating device is provided with a post-move travel path generating unit which generates a post-move tool path in which the path corresponding to the section of insufficiency has been moved relative to the first tool path to a path whereby the section of insufficiency can be machined using the section of the tool within the effective cutting length, and an auxiliary path generating unit which generates an auxiliary tool path for machining the uncut section remaining in the workpiece.

8 Claims, 15 Drawing Sheets

(58) Field of Classification Search
USPC .......................................................... 700/187
See application file for complete search history.

(56) References Cited

U.S. PATENT DOCUMENTS

| | | | | |
|---|---|---|---|---|
| 5,122,966 | A * | 6/1992 | Jansen | ............... G05B 19/4069 |
| | | | | 700/178 |
| 5,526,272 | A | 6/1996 | Kondo et al. | |
| 6,447,223 | B1 * | 9/2002 | Farah | ..................... G05B 19/41 |
| | | | | 318/570 |
| 7,149,599 | B2 * | 12/2006 | Arai | .................. G05B 19/4097 |
| | | | | 700/186 |
| 9,573,202 | B2 * | 2/2017 | Yasukochi | ........... B23Q 15/007 |
| 2012/0203373 | A1 | 8/2012 | Lee et al. | |
| 2013/0046405 | A1 * | 2/2013 | Shamoto | ............. G05B 19/404 |
| | | | | 700/190 |

FOREIGN PATENT DOCUMENTS

| | | |
|---|---|---|
| JP | 3-30002 | 2/1991 |
| JP | 6-119031 | 4/1994 |
| JP | 6-348322 | 12/1994 |
| JP | 9-292913 | 11/1997 |
| JP | 2012-164269 | 8/2012 |
| JP | 2013-161111 | 8/2013 |

* cited by examiner

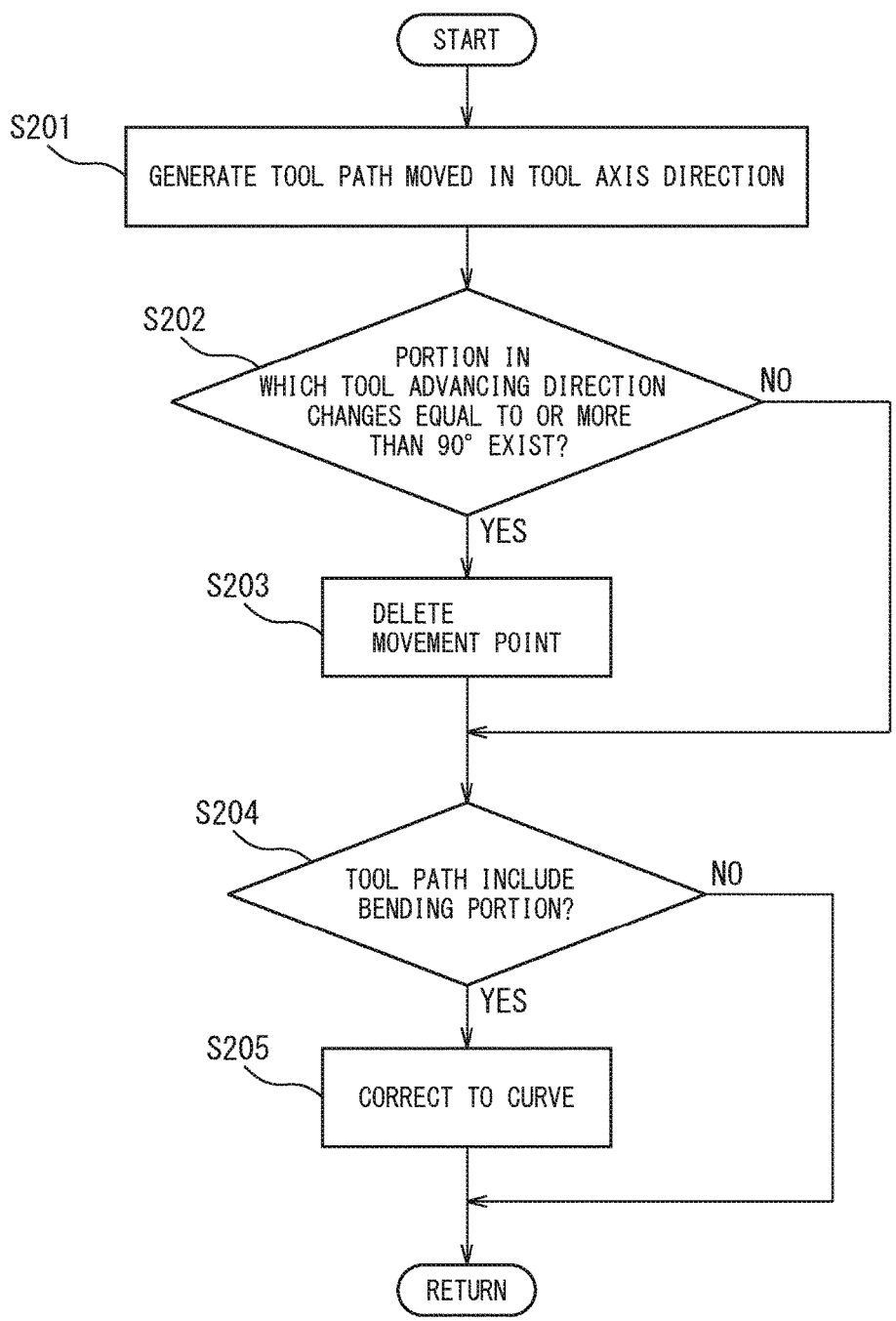

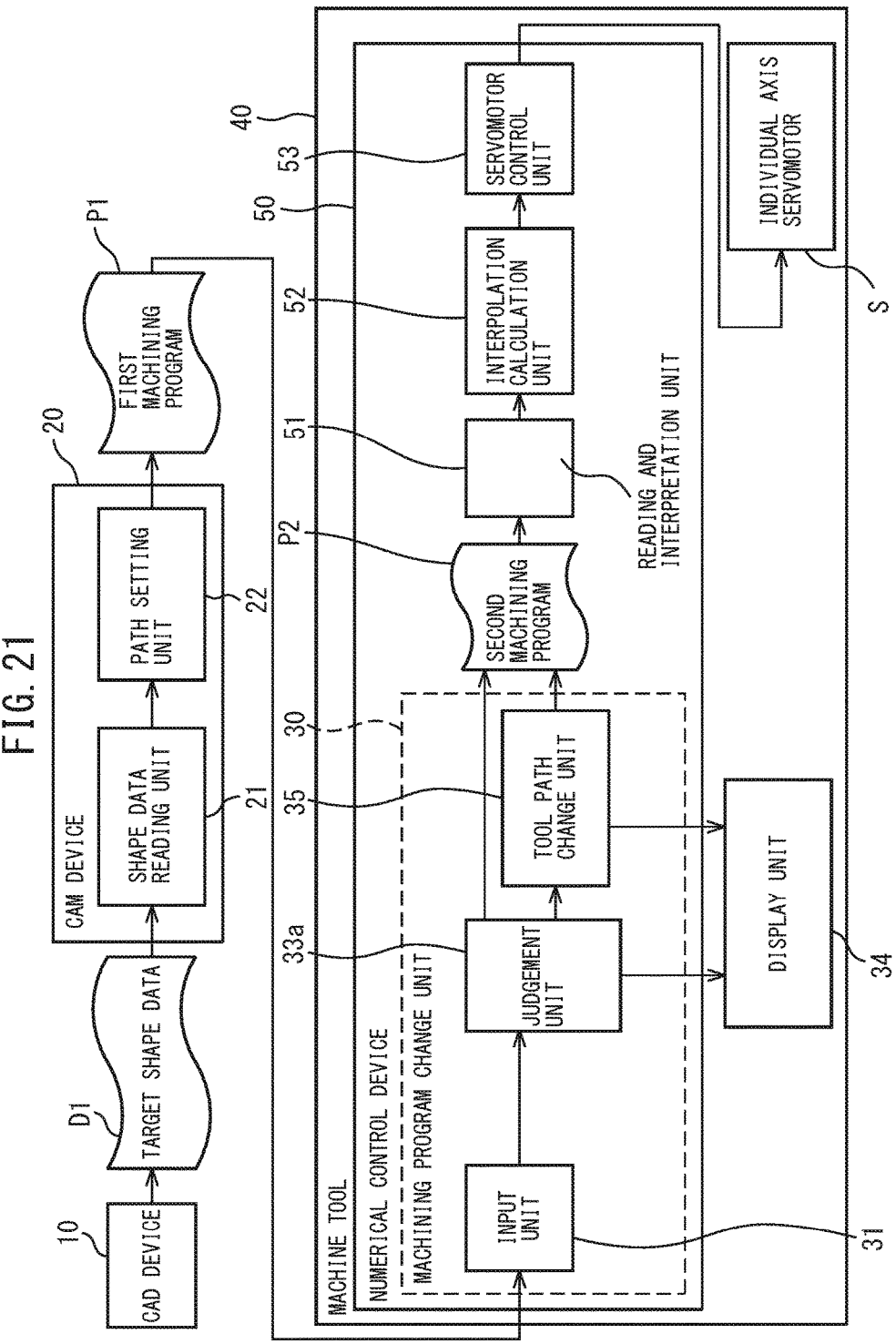

METHOD OF GENERATING TOOL PATH BY MODIFYING EXISTING TOOL PATH AND DEVICE PRACTICING THE SAME

CROSS REFERENCE TO RELATED APPLICATIONS

This application is a U.S. National Phase patent application of International Patent Application No. PCT/JP2013/074921, filed on Sep. 13, 2013, which is hereby incorporated by reference in the present disclosure in its entirety.

FIELD OF THE INVENTION

The present invention relates to a tool path generation method and a tool path generation device.

BACKGROUND OF THE INVENTION

In a conventional technique, machine tools are known which perform machining, such as cutting, by moving tools relative to workpieces. In such machine tools, a numerical control-type machine tool is known which specifies a path of a tool with respect to a workpiece by coordinates of a predetermined axis or the like and performs machining by moving the tool with respect to the workpiece. At least one of the workpiece and the tool is moved, so that machining, such as cutting, can be performed while changing a relative position of the tool to the workpiece.

The machine tool performs machining on a workpiece having a predetermined shape to form the workpiece into a target shape. A machining program for driving the machine tool can be generated by a user as well as a computer aided manufacturing (CAM) device based on a target shape of a designed workpiece. The target shape of the workpiece can be generated by, for example, a computer aided design (CAD) device. Data of the target shape of the workpiece generated by the CAD device is supplied to the CAM device. The CAM device can generate the machining program for the machine tool based on the target shape of the workpiece. In such a system, many processes can be automated for machining a workpiece having a desired shape.

According to Japanese Laid-open Patent Publication No. 2012-164269, a machining path producing method for removing a part of a material by cutting. The method is to automatically judge a shape which can be cracked based on a three-dimensional CAD model of a product design and automatically generate a machining path for a cracking machining method.

CITATIONS LIST

Patent Literature

Patent literature 1: Japanese Laid-open Patent Publication No. 2012-164269

SUMMARY OF THE INVENTION

A CAM device can generate a tool path including a relative position of a tool to a workpiece based on an initial shape of the workpiece and a target shape of the workpiece, tool information, and the like. For example, a tool path can be generated based on a shape of a material, a target shape of a workpiece, a tool diameter, and the like. When cutting is performed on a workpiece, the CAM device can generate a tool path along a target shape of the workpiece. Then, a machining program can be generated from the generated tool path.

A tool includes a blade part and parts other than the blade part, such as a shank part (a handle of the tool). The tool can perform machining by the blade part and cannot perform machining by the shank part and others. In other words, the tool has a range in which machining can be performed. When machining is performed on a portion having a size exceeding an effective blade length of the blade part of the tool, it is not possible to perform machining to the target shape at once. Therefore, it is necessary to remove an excess portion of a workpiece in advance. For example, it is necessary to machine a workpiece in advance to a shape close to the target shape using an electric discharge machine and the like.

Alternatively, an excess portion of a workpiece can be removed in advance by cutting using a predetermined tool. There is a need for a user to determine an excess portion to be removed from a workpiece and generate a tool path for removing the excess portion. In order to calculate the tool path for removing the excess portion, it is necessary to repeat calculation of the tool path while adjusting parameter settings of the CAM device. Further, after generating the tool path for removing the excess portion, it is necessary to confirm whether or not an effective blade length portion of the tool can perform machining to a target shape by simulation and the like. When any problem arises as a result of confirmation of the tool path, there is a problem that the tool path has to be generated again.

As described above, when cutting exceeding the effective blade length of the tool is performed, there is a problem that it takes time and effort. In addition, if a user overlooks a lack of the effective blade length of the tool, there is a risk that machining by the machine tool is interrupted in the middle of the machining.

A tool path generation method according to the present invention is a tool path generation method for generating a tool path for machining a workpiece by a machine tool, and a first tool path for machining the workpiece is set in advance. The tool path generation method includes a judgement step for judging whether or not an effective blade length of a tool is insufficient when machining is performed through the first tool path based on the first tool path and a shape of the workpiece and an estimation step for estimating an insufficient portion in which the effective blade length is insufficient when the effective blade length of the tool is insufficient in the judgement step. The tool path generation method includes a moved path generation step for generating a moved tool path by moving a path of the insufficient portion to a path through which machining can be performed by a portion of the effective blade length with respect to the first tool path and an auxiliary path generation step for generating an auxiliary tool path for machining an uncut portion remaining on the workpiece after machining is performed through the moved tool path.

According to the above-described invention, the moved path generation step can include a step for generating the moved tool path by moving the first tool path in a direction in which the tool is relatively apart in an axis direction of the tool with respect to the workpiece.

According to the above-described invention, the auxiliary path generation step can include the judgement step, the estimation step, and the moved path generation step, the judgement step can include a step for selecting the first tool path when machining can be performed by the portion of the effective blade length of the tool, and the auxiliary path generation step can include a step for generating the moved tool path by repeating the judgement step, the estimation step, and the moved path generation step until machining can be performed by the portion of the effective blade length of the tool when the workpiece is machined through the first tool path in the judgement step and a step for generating the auxiliary tool path including the moved tool path and the first tool path.

According to the above-described invention, the first tool path and the moved tool path are constituted by paths for moving a plurality of movement points, and the moved path generation step can include a step for judging whether or not a specific path exists in which an advancing direction of the tool in the moved tool path is changed by an angle more than a judgement angle with respect to an advancing direction of the tool in the first tool path and a step for excluding the movement points corresponding to the specific path from the moved tool path when the specific path exists.

According to the above-described invention, the moved path generation step can include a step for judging whether or not a bending path is included in the moved tool path and a step for changing the bending path to a curved path when the bending path is included.

A tool path generation device according to the present invention is a tool path generation device which generates a machining program including a tool path for machining a workpiece and comprises a judgement unit configured to judge whether or not an effective blade length of a tool is insufficient when machining is performed through the first tool path based on the first tool path and a shape of the workpiece and an estimation unit configured to estimate an insufficient portion in which the effective blade length is insufficient when the effective blade length of the tool is insufficient. The tool path generation device includes a moved path generation unit configured to generate a moved tool path by moving a path of the insufficient portion to a path through which machining can be performed by a portion of the effective blade length with respect to the first tool path and an auxiliary path generation unit configured to generate an auxiliary tool path for machining an uncut portion remaining on the workpiece after machining is performed through the moved tool path. The tool path generation device includes a program generation unit configured to generate a machining program in which a second tool path is set based on the moved tool path and the auxiliary tool path.

According to the above-described invention, the moved path generation unit can generate a tool path by moving the first tool path in a direction in which the tool is relatively apart in an axis direction of the tool with respect to the workpiece.

According to the above-described invention, the auxiliary path generation unit can include the judgement unit, the estimation unit, and the moved path generation unit, the judgement unit is configured to select the first tool path when machining can be performed by the portion of the effective blade length of the tool, and the auxiliary path generation unit can repeatedly generate the moved tool path until machining can be performed by the portion of the effective blade length of the tool when the workpiece is machined through the first tool path in the judgement unit and generate the auxiliary tool path including the moved tool path and the first tool path.

According to the present invention, the tool path generation method and the tool path generation device can be provided each of which generates a tool path for machining a portion larger than an effective blade length of a tool.

BRIEF DESCRIPTION OF THE DRAWINGS

FIG. 20 is a flowchart of a method for generating a corrected tool path by correcting a moved tool path.

FIG. 21 is a block diagram illustrating a second machining system according to the embodiment.

DETAILED DESCRIPTION OF THE INVENTION

A tool path generation method, a tool path generation device, and a control device of a machine tool according to an embodiment are described with reference to FIG. 1 to FIG. 21. A tool path according to the present invention is a relative path of a tool with respect to a workpiece when the tool machines the workpiece while the tool moves relative to the workpiece.

Figure 1:
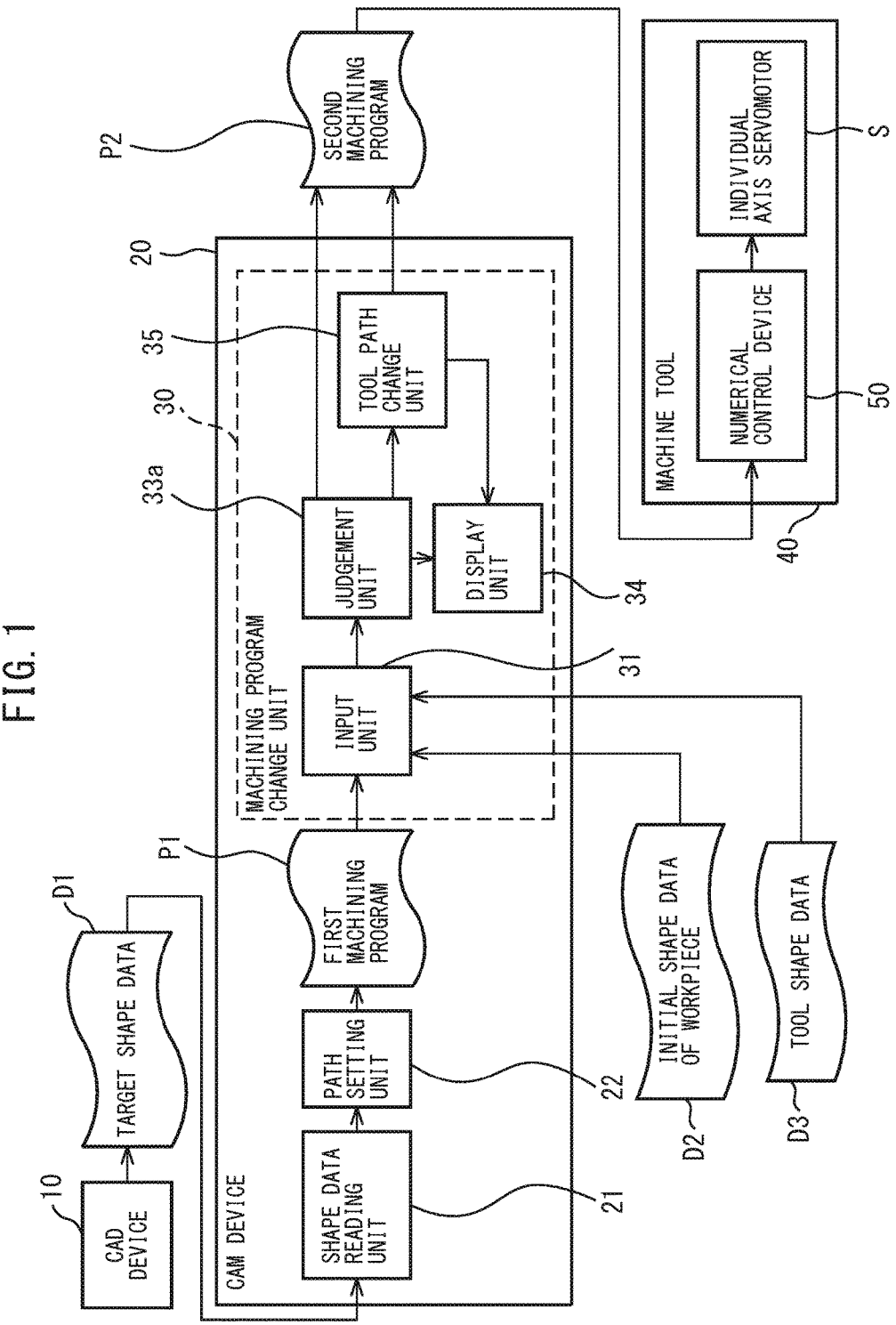
FIG. 1 is a block diagram of a first machining system according to an embodiment.

FIG. 1 is a block diagram illustrating a first machining system according to the present embodiment. The machining system of the present embodiment comprises a CAD device 10, a CAM device 20, and a machine tool 40. The CAD device 10 generates target shape data D1 of a workpiece according to an operation by a user. The target shape data D1 generated by the CAD device 10 is input to the CAM device 20.

The CAM device 20 generates a machining program in which a tool path at the time when the machine tool 40 machines a workpiece is set. In the first machining system, the CAM device 20 corresponds to the tool path generation device. The CAM device 20 outputs a second machining program P2 for machining a workpiece to a target shape. The CAM device 20 comprises a shape data reading unit 21 and a path setting unit 22. The shape data reading unit 21 reads the target shape data D1 generated by the CAD device 10. The path setting unit 22 generates a tool path based on the target shape data D1, tool shape data, and the like. In the first machining system, an initial tool path generated by the path setting unit 22 is referred to as a first tool path R1. The path setting unit 22 generates a first machining program P1 in which the first tool path R1 is set.

The CAM device 20 includes a machining program change unit 30. The machining program change unit 30 reads the first machining program P1 and obtains the first tool path R1. The machining program change unit 30 generates a second tool path R2 by correcting the first tool path R1. The machining program change unit 30 generates the second machining program P2 in which the second tool path R2 is set.

The second machining program P2 generated by the CAM device 20 is input to the machine tool 40. The machine tool 40 includes a numerical control device 50 and an individual axis servomotor S. The numerical control device 50 reads and interprets the second machining program P2. The numerical control device 50 transmits an operation command to the individual axis servomotor S based on the second machining program P2. The individual axis servomotor S is driven according to the operation command, so that the tool is moved relative to the workpiece.

Figure 2:
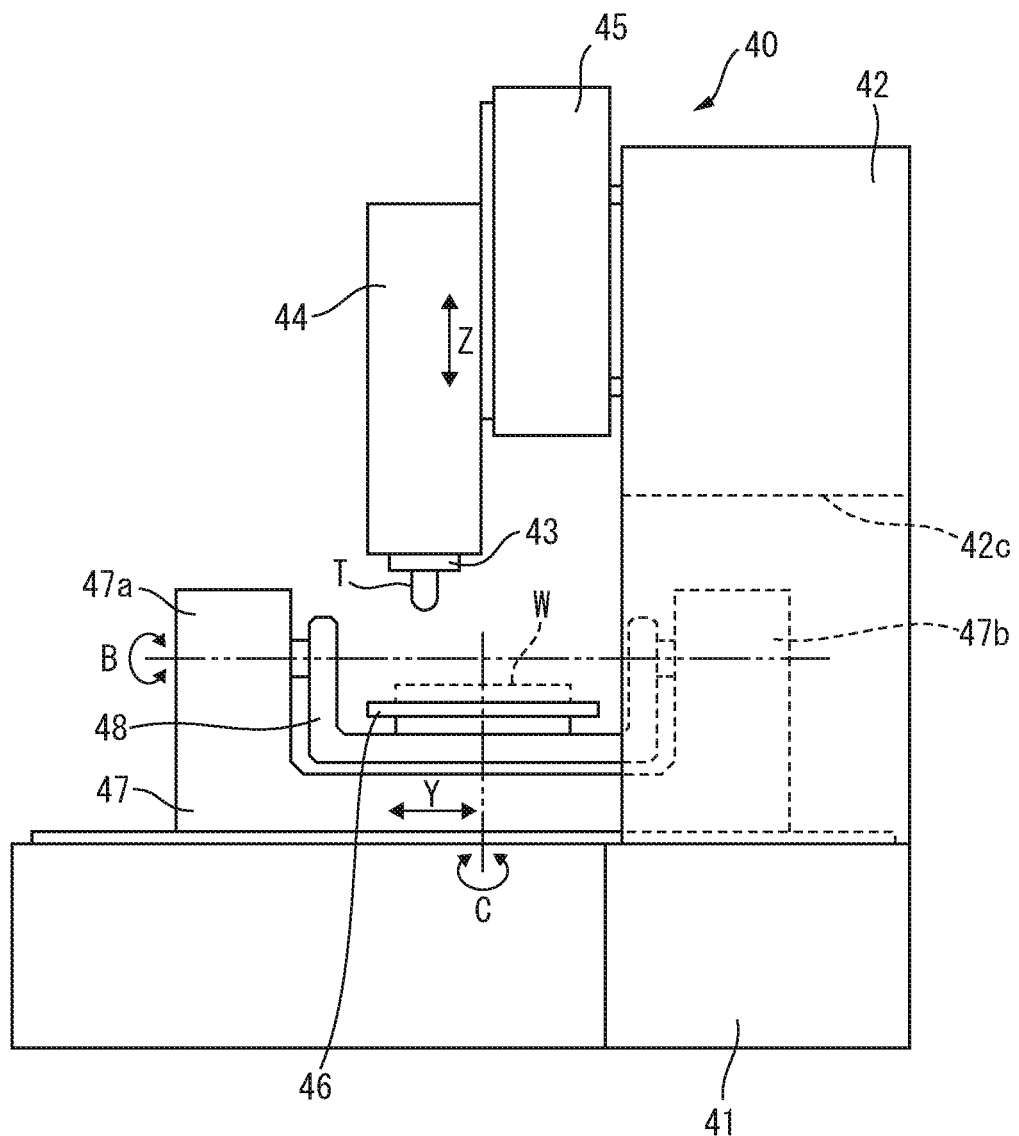
FIG. 2 is a schematic side view of a machine tool.

FIG. 2 shows a schematic side view of the machine tool 40 according to the present embodiment. The machine tool 40 is a rotary table type device which rotates a rotary table 46 together with a workpiece W. In the machine tool 40, an X axis, a Y axis, and a Z axis which are perpendicular to each other are set. The Z axis is a linear motion axis extending in a direction in which a main spindle 43 moves toward the workpiece W. The Y axis is a linear motion axis extending parallel to a direction in which a carriage 47 moves. A linear motion axis perpendicular to the Z axis and the Y axis is set to the X axis. Further, the machine tool 40 includes a B axis as a rotation axis around an axis center extending parallel to the Y axis. The machine tool 40 includes a C axis as a rotation axis around an axis center extending parallel to the Z axis.

The machine tool 40 comprises a bed 41 as a base and a column 42 stood on an upper surface of the bed 41. The machine tool 40 includes a main spindle head 44 rotatably supporting the main spindle 43 and a saddle 45 supporting the main spindle head 44 at the front of the column 42. The main spindle head 44 supports the main spindle 43 downward so that a tip end of the main spindle 43 faces the rotary table 46. A tool T is attached to the tip end of the main spindle 43.

The machine tool 40 includes the rotary table 46 on which the workpiece W is placed and a U-shaped swing support member 48 for supporting the rotary table 46. The machine tool 40 includes the U-shaped carriage 47 for supporting the swing support member 48. The carriage 47 supports the swing support member 48 by a pair of columns 47a and 47b which are separated in a Y-axis direction. The swing support member 48 is supported by the carriage 47 at end portions on both sides in the Y-axis direction. The swing support member 48 is supported swingably around an axial line of the B axis.

The machine tool 40 includes a movement device for moving a tool relative to a workpiece based on each moving axis. The movement device includes the individual axis servomotor S which is driven along each moving axis. The movement device moves the saddle 45 in an X-axis direction with respect to the column 42. The movement device moves the carriage 47 in the Y-axis direction with respect to the bed 41. In the column 42, a hollow part 42c is formed so that the carriage 47 can be partially entered thereinto. The movement device moves the main spindle head 44 in a Z-axis direction with respect to the saddle 45. The movement device includes a movement device of the rotary table 46, and the rotary table 46 rotates about an axial line of the C axis. Further, the movement device rotates the swing support member 48 about the axial line of the B axis with respect to the carriage 47.

As described above, the machine tool 40 of the present embodiment includes three linear motion axes perpendicular to each other and rotation axes rotating about the axial line of the B axis and the axial line of the C axis. The machine tool 40 of the present embodiment is a five-axis control type machine tool.

Figure 3:
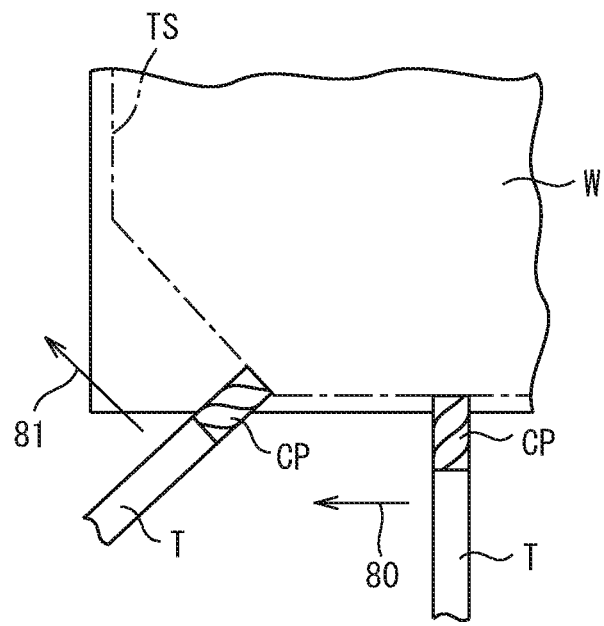
FIG. 3 is a schematic plan view of a workpiece and a tool when the workpiece is machined.

FIG. 3 is a schematic plan view of a workpiece and a tool when the workpiece is machined. According to the present embodiment, an end mill is used as a tool T. The tool T includes a blade part CP which can perform cutting. The tool T can perform machining using a side surface of the blade part CP.

In a machining example, machining is performed to cut the workpiece W into a target shape TS. The target shape TS is determined at the time of designing. A tool path is set along the target shape TS. The tool T and the workpiece W are relatively moved along the tool path, and thus the workpiece W can be cut. As indicated by an arrow 80, when the tool T is moved along a side surface of the workpiece W, a portion to be cut is small, and machining can be performed by the blade part CP. However, at a corner portion of the workpiece W, machining is performed in a direction inclined to the side surface of the workpiece W in some cases. When the tool T is moved along the target shape TS as indicated by an arrow 81 at the corner portion of the workpiece W, a length of the blade part CP becomes shorter than the portion to be cut.

Figure 4:
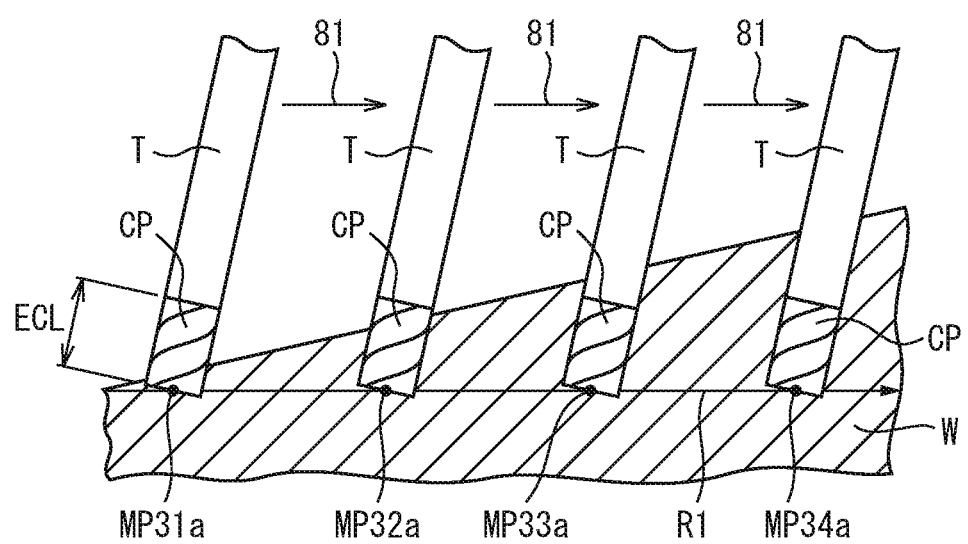
FIG. 4 is a first schematic cross sectional view of a workpiece and a tool when the workpiece is machined.

FIG. 4 is a schematic cross sectional view of the workpiece and the tool which illustrates a state in which an effective blade length of the blade part of the tool is insufficient. The tool T has an effective blade length ECL capable of machining. The effective blade length ECL corresponds to a length capable of machining from a tool tip end in an axis direction of the tool in a region in which the blade part CP is formed.

In FIG. 4, the first tool path R1 along the target shape TS is indicated. The first tool path R1 includes movement points MP31a, MP32a, MP33a, and MP34a which are referred to as block points. The tool T is controlled, for example, so that the center of the tool tip end advances along the first tool path R1. As indicated by the arrow 81, the tool T performs machining while moving with respect to the workpiece W. With progression of the machining, the first tool path R1 is separated from a surface of the workpiece W. In this case, a cutting depth exceeds the effective blade length ECL, and the machining becomes impossible. For example, the machining becomes impossible at the movement points MP33a and MP34a.

The CAM device 20 of the present embodiment judges whether or not the effective blade length ECL of the tool T is insufficient for a portion to be cut when machining is performed through the first tool path R1. When the effective blade length ECL of the tool T is insufficient, the CAM device 20 generates a moved tool path by moving the first tool path R1 so that cutting can be performed by an effective blade length ECL portion.

Figure 5:
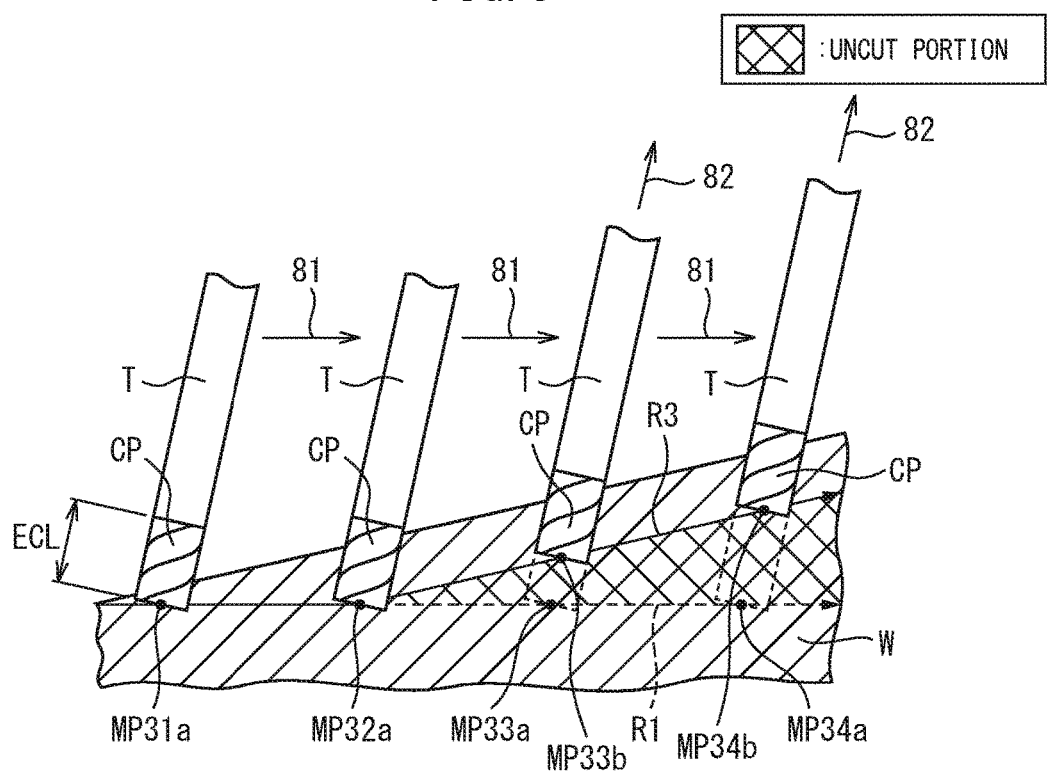
FIG. 5 is a second schematic cross sectional view of a workpiece and a tool when the workpiece is machined.

FIG. 5 is a schematic cross sectional view of the workpiece and the tool indicating the first tool path and the moved tool path. When the effective blade length ECL of the tool T is insufficient, the CAM device 20 generates a moved tool path R3 by moving the first tool path R1 to an axis direction of the tool T. As indicated by an arrow 82, movement points of the tool T are changed to a direction separating from the workpiece W among directions in the rotation axis of the tool T. The movement point MP33a is moved to a movement point MP33b so that the machining can be performed by the effective blade length ECL portion of the tool T. The movement point MP34a is also moved to a movement point MP34b. The moved tool path R3 including the movement points MP33b and MP34b is generated.

By the above-described control, machining can be performed in the range of the effective blade length ECL of the blade part CP. However, since the workpiece W is not cut up to the target shape TS, an uncut portion remains in the workpiece W when machining is performed through the moved tool path R3. The CAM device 20 next generates an auxiliary tool path for cutting the uncut portion.

According to the present embodiment, the first tool path R1 is discussed as an auxiliary tool path. If machining can be performed by the effective blade length ECL portion of the tool T when the machining is performed through the first tool path R1, the first tool path R1 is selected. If the effective blade length ECL of the tool T is insufficient when the machining is performed through the first tool path R1, a moved tool path is added again by moving the first tool path R1 in the direction apart from the workpiece W in the axis direction of the tool T. As described above, the moved tool path is generated until the machining can be finally performed through the first tool path R1. The second tool path R2 is generated by combining one or more the moved tool paths R3 and the first tool path R1. The second tool path R2 is a path through which the tool T actually machines the workpiece W.

Figure 6:
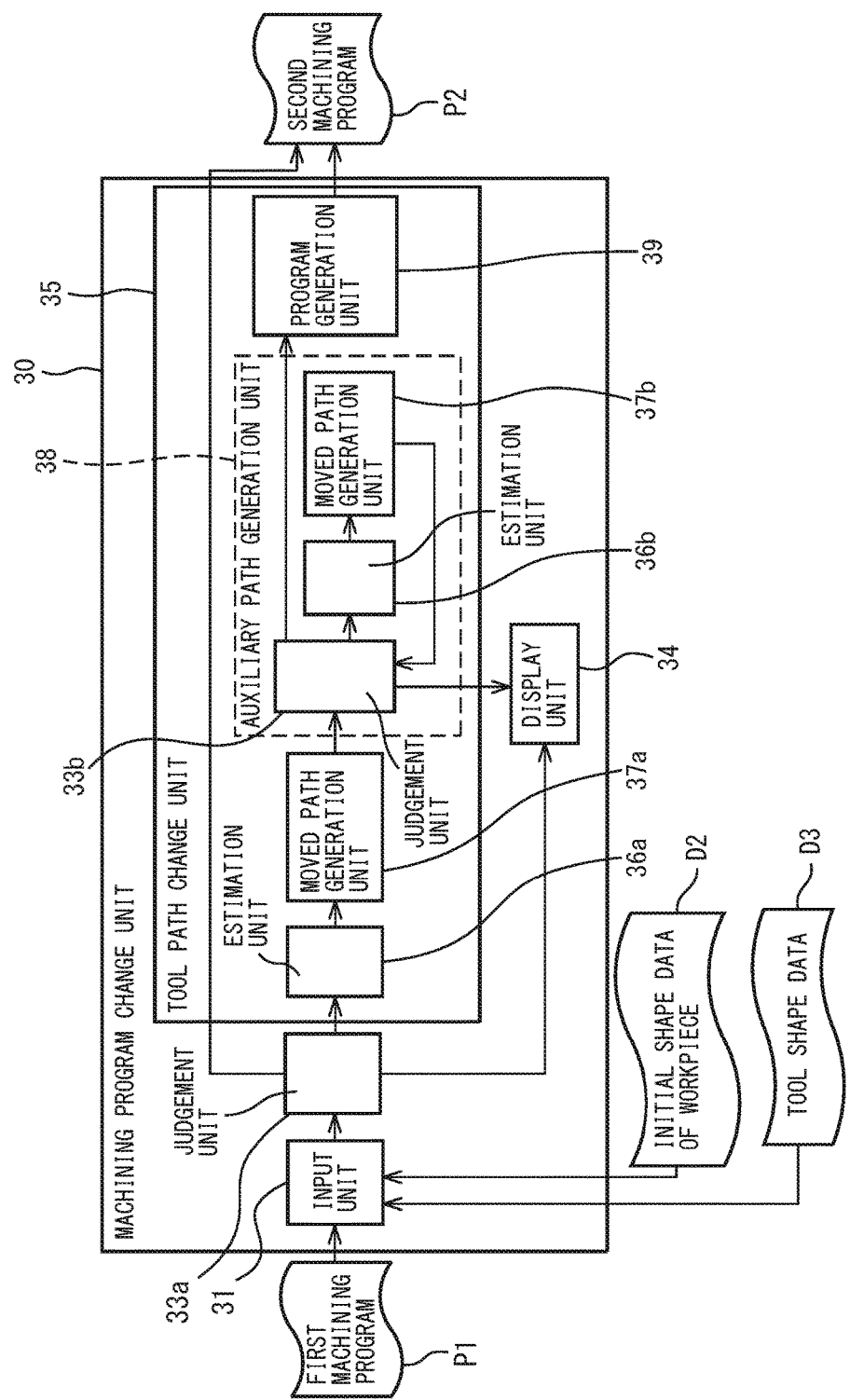
FIG. 6 is a block diagram illustrating a machining program change unit according to the embodiment.

FIG. 6 shows a block diagram of the machining program change unit of the CAM device according to the present embodiment. With reference to FIG. 1 and FIG. 6, the machining program change unit 30 includes an input unit 31. Initial shape data D2 of the workpiece W is input to the input unit 31. The initial shape data D2 of the workpiece W is, for example, shape data of a material before the workpiece W is machined. Tool shape data D3 is also input to the input unit 31. The tool shape data D3 includes a type, a tool diameter, and the effective blade length ECL of the blade part CP of the tool T. The first machining program P1 including information of the first tool path R1 is input to the input unit 31. The first tool path R1 is a tool path along the target shape TS of the workpiece W.

The machining program change unit 30 includes a judgement unit 33a. The judgement unit 33a judges whether or not the effective blade length ECL of the tool T is insufficient based on the first tool path R1, the shape of the tool T, and the initial shape of the workpiece when machining is performed through the first tool path R1. For example, the judgement unit 33a estimates a length that the tool T is in contact with the workpiece W. When the contacting length exceeds the effective blade length ECL, the judgement unit 33a can judge that the effective blade length ECL is insufficient.

When the effective blade length ECL of the tool T is longer than a portion to be cut, the judgement unit 33a can judge that machining can be performed by the effective blade length ECL portion of the tool T. In this case, the judgement unit 33a outputs the first machining program P1 as the second machining program P2. In other words, the first machining program P1 is output as the second machining program P2 without changing.

When the effective blade length ECL of the tool T is shorter than a portion to be cut, the judgement unit 33a can judge that the effective blade length ECL of the tool T is insufficient. When the effective blade length ECL of the tool T is insufficient, the judgement unit 33a transmits the first tool path R1 to a tool path change unit 35.

The tool path change unit 35 includes an estimation unit 36a. The estimation unit 36a estimates an insufficient portion which is a portion in which the effective blade length ECL of the tool T is insufficient in the first tool path R1. According to the present embodiment, an insufficient region which is a region where the effective blade length ECL of the tool T is insufficient is estimated as the insufficient portion. The estimation unit 36a judges whether or not machining can be performed by the effective blade length ECL portion of the tool T at each movement point and sets the insufficient region. For example, with reference to FIG. 5, the estimation unit 36a can set a region in the first tool path R1 including the movement points MP33a and MP34a to the insufficient region. Next, when the effective blade length ECL of the blade part CP is insufficient at each movement point, calculation is performed to move the movement point along the axis direction of the tool T.

With reference to FIG. 6, the tool path change unit 35 includes a moved path generation unit 37a. The moved path generation unit 37a moves the first tool path R1 in the insufficient region to a path at which machining can be performed by the effective blade length ECL portion and generates the moved tool path R3. For example, with reference to FIG. 5, the moved path generation unit 37a moves the movement points MP33a and MP34a in the axis direction of the tool T and generates the movement points MP33b and MP34b. The moved path generation unit 37a sets a path including the movement points MP31a, MP32a, MP33b, and MP34b to the moved tool path R3.

As described above, the tool path change unit 35 judges whether or not the effective blade length ECL of the tool T is insufficient regarding all of the movement points and, when the effective blade length ECL is insufficient, moves the movement points in the axis direction of the tool T to generate the moved tool path R3. The tool path change unit is not limited to this embodiment and can move the first tool path to a tool path through which machining can be performed by the effective blade length ECL portion by arbitrary control. For example, the first tool path may be moved in a direction different from an axis direction of a tool.

With reference to FIG. 5, after machining is performed through the moved tool path R3, an uncut portion remains in the workpiece W. With reference to FIG. 6, the tool path change unit 35 includes an auxiliary path generation unit 38 which generates an auxiliary tool path for machining an uncut portion. The auxiliary path generation unit 38 includes a judgement unit 33b, an estimation unit 36b, and a moved path generation unit 37b.

The judgement unit 33b has a function similar to that of the judgement unit 33a. The judgement unit 33b judges whether or not an insufficient region is generated when the workpiece W which is machined through the tool path generated until the present time is machined through the first tool path R1. If the insufficient region is not generated when being machined through the first tool path R1, the judgement unit 33b generates the second tool path R2 by combining the tool paths generated until the present time. Then, the judgement unit 33b transmits the second tool path R2 to a program generation unit 39. The program generation unit 39 generates the second machining program P2 based on the second tool path R2.

The estimation unit 36b has a function similar to that of the estimation unit 36a. The moved path generation unit 37b has a function similar to that of the moved path generation unit 37a. When the judgement unit 33b judges that the effective blade length ECL of the tool T is insufficient when machining is performed through the first tool path R1, the estimation unit 36b estimates the insufficient region. The moved path generation unit 37b generates a moved tool path by moving the first tool path R1.

Next, returning to the judgement unit 33b, it is judged whether or not the effective blade length ECL of the tool T is insufficient when machining is performed through the first tool path R1 in a similar way to the previous time. In other words, it is judged whether or not the effective blade length ECL of the tool T is insufficient when an uncut portion of the workpiece W is cut through the first tool path. When the effective blade length ECL of the tool T is insufficient, the estimation unit 36b and the moved path generation unit 37b further generate the moved tool path.

As described above, the judgement unit 33b repeatedly generates the moved tool path until machining can be performed by the effective blade length ECL portion of the tool T when the workpiece W is machined through the first tool path R1. In other words, the moved tool path is added. A path combining the moved tool path R3 generated by the auxiliary path generation unit 38 and the first tool path R1 finally selected by the auxiliary path generation unit 38 corresponds to the auxiliary tool path. When it becomes possible to perform machining by the effective blade length ECL portion of the tool T, the judgement unit 33b generates the second tool path R2 by combining the first tool path R1 and one or more moved tool paths R3 generated until the present time and transmits the second tool path R2 to the program generation unit 39.

The machining program change unit 30 of the present embodiment includes a display unit 34. The display unit 34 can display information regarding results judged by the judgement units 33a and 33b, information of the first tool path R1, information of the moved tool path R3, information of the second tool path R2, and the like. A user can confirm a generated tool path and correct the generated tool path based on the information pieces.

According to the present embodiment, the insufficient region which is a region where the effective blade length ECL of the tool T is insufficient is estimated as the insufficient portion, and then movement points included in the insufficient region is moved. As the insufficient portion, a single movement point can be adopted without being limited to the present embodiment. In other words, it is judged whether or not the effective blade length ECL of the tool T is insufficient with respect to a single movement point, and when the effective blade length ECL is insufficient, the single movement point is moved. Then, the judgement and movement per movement point can be repeated on all of the movement points.

Figure 7:
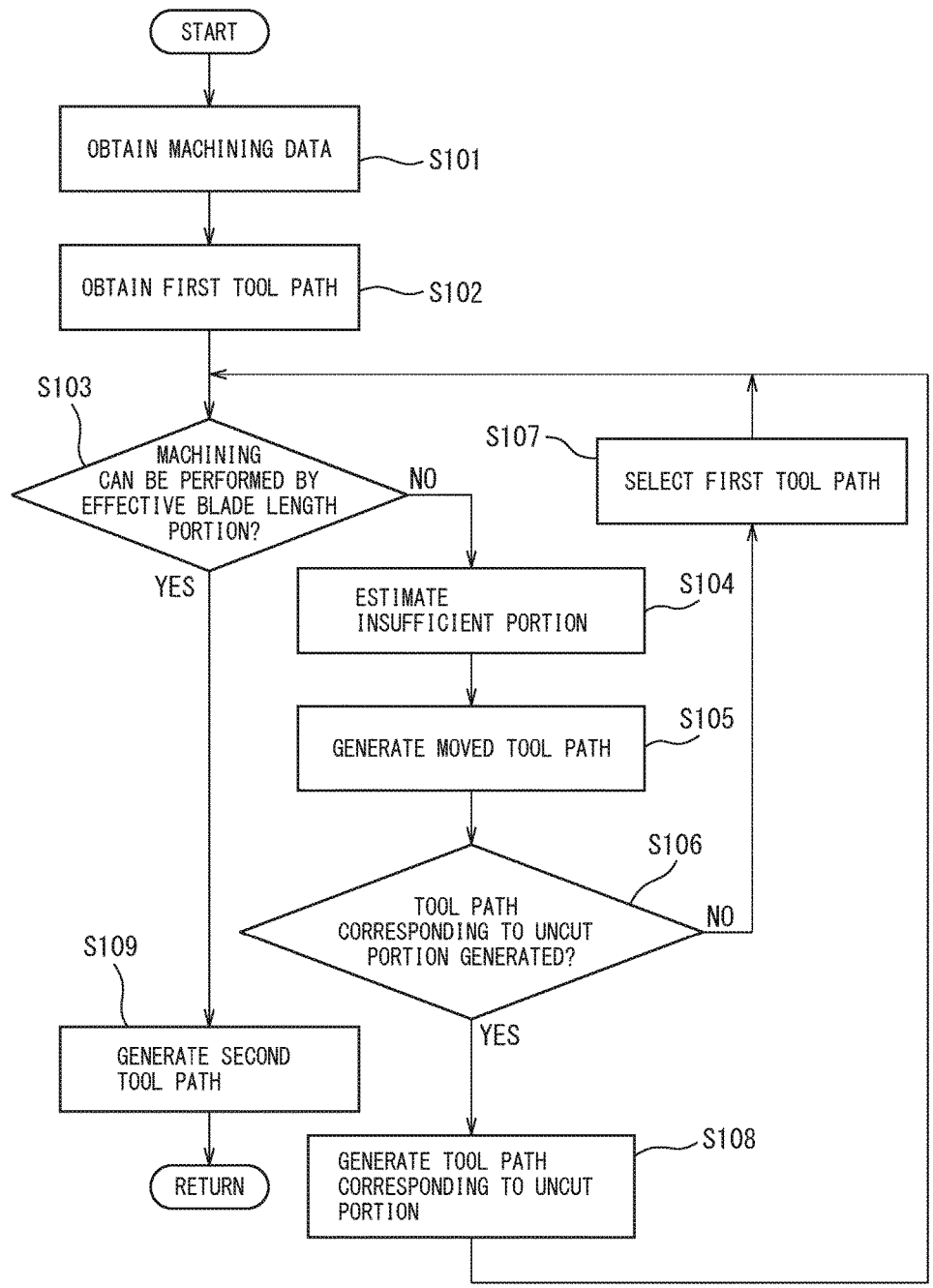
FIG. 7 is a flowchart of a tool path generation method according to the embodiment.

FIG. 7 is a flowchart of the tool path generation method according to the present embodiment. According to the present embodiment, control based on the method is performed by the machining program change unit 30. The first tool path R1 for machining the workpiece W is set in advance.

In step S101, machining data is obtained. The machining data includes the initial shape data D2 of the workpiece and the tool shape data D3. In step S102, the first tool path R1 is obtained. After obtaining the first machining program P1, the first tool path R1 can be obtained from the first machining program P1.

Next, in step S103, a judgement step is performed in which it is judged whether or not the effective blade length ECL of the tool T is insufficient when machining is performed through the first tool path R1 based on the first tool path R1 and the shape of the workpiece W. In other words, it is judged whether or not machining can be performed by the effective blade length ECL portion of the tool T. In step S103, when machining can be performed by the effective blade length ECL portion of the tool T, the control is shifted to step S109. In step S109, the second tool path is generated by combining tool paths generated until the present time. When it is judged that machining can be performed through the first tool path in step S103 of the first time, then in step S109, the second tool path identical to the first tool path is generated.

In step S103, when the effective blade length ECL of the tool T is insufficient, the control is shifted to step S104. In step S104, an estimation step is performed for estimating the insufficient portion in which the effective blade length ECL is insufficient. According to the present embodiment, the insufficient region is estimated as the insufficient portion. Next, in step S105, a moved path generation step is performed for generating the moved tool path in the insufficient region. The moved tool path is generated by moving the first tool path to a path through which machining can be performed by the effective blade length ECL portion. According to the present embodiment, the tool path is generated by moving the first tool path R1 in a direction apart from the workpiece W along the axis direction of the tool T as described above.

Next, an auxiliary path generation step is performed for generating the auxiliary tool path for machining the uncut portion remaining on the workpiece W. In step S106, it is selected whether to generate a tool path corresponding to the uncut portion or not for machining the uncut portion remaining on the workpiece W. The selection is set by a user in advance. In order to cut the uncut portion, an entire tool path of the first tool path R1 can be selected again. Alternatively, the first tool path in a region in which the uncut portion exists can be selected in the first tool path R1. In other words, a partial path of the first tool path R1 can be selected. In step S106, when the entire path of the first tool path R1 is selected, the control is shifted to step S107.

In step S107, the first tool path R1 is set as the tool path for cutting the uncut portion, and the control is returned to step S103. In step S106, when the tool path corresponding to the uncut portion is selected, the control is shifted to step S108. In step S108, a partial tool path of the first tool path R1 corresponding to the uncut portion is generated. Then, the control is shifted to step S103.

In step S103, it is judged whether or not machining can be performed by the effective blade length ECL portion of the tool T based on the entire or the part of tool path of the first tool path. When machining cannot be performed by the effective blade length ECL portion of the tool T, the control is shifted to step S104 again. Further, the judgement step, the estimation step of the insufficient portion, and the moved path generation step are repeated. As described above, the judgement step, the estimation step, and the moved path generation step are repeated until it becomes possible to perform machining by the effective blade length ECL portion of the tool T when the workpiece is machined in the first tool path R1. The moved tool path is added every time the moved path generation step is repeated. The auxiliary tool path is generated which includes such added moved tool paths and the first tool path R1 in which machining is finally performed. The auxiliary tool path includes only the first tool path R1 without being added with the moved tool path in some cases.

In step S103, when machining can be performed by the effective blade length ECL portion of the tool T, the control is shifted to step S109. In step S109, the second tool path R2 is generated which includes the moved tool paths generated until the present time and the first tool path R1.

Next, the tool path generation method for machining the uncut portion is described using an embodiment for machining another workpiece.

Figure 8:
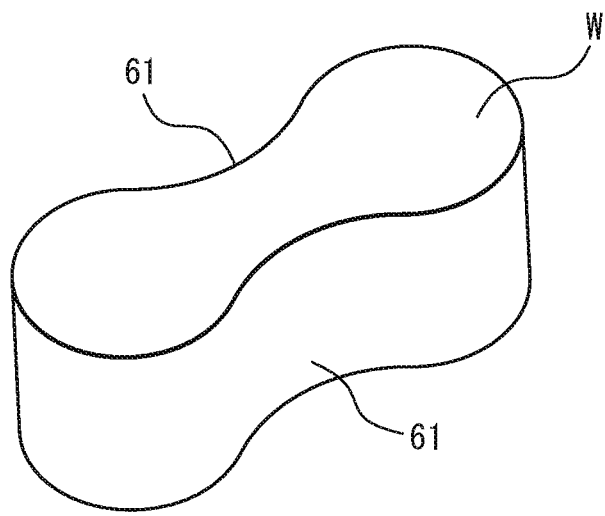
FIG. 8 is a perspective view of a workpiece having a target shape.
Figure 9:
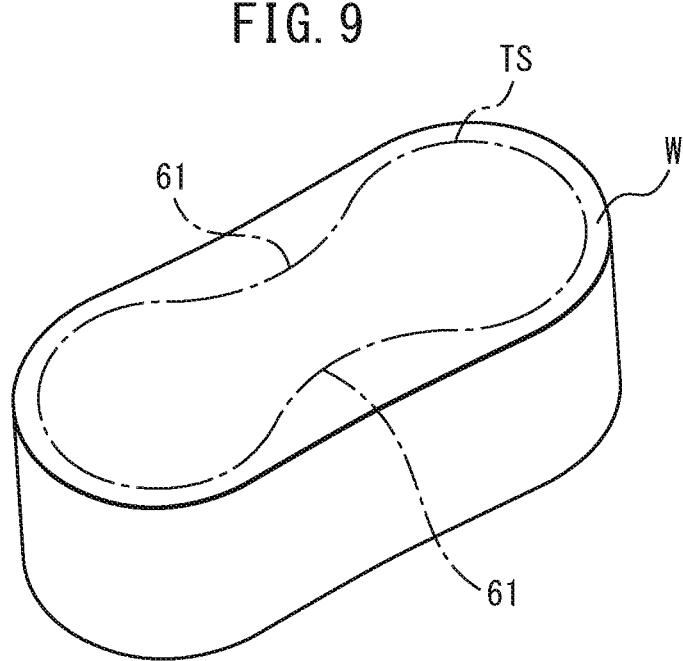
FIG. 9 is a perspective view of a workpiece having an initial shape.

FIG. 8 is a schematic perspective view of a workpiece having a target shape. FIG. 9 is a schematic perspective view of a workpiece W having an initial shape. With reference to FIG. 8 and FIG. 9, in the machining example, the workpiece W having the initial shape is partially cut to have the target shape TS. The machining includes a step for forming a concave portion 61 on the workpiece W.

Figure 10:
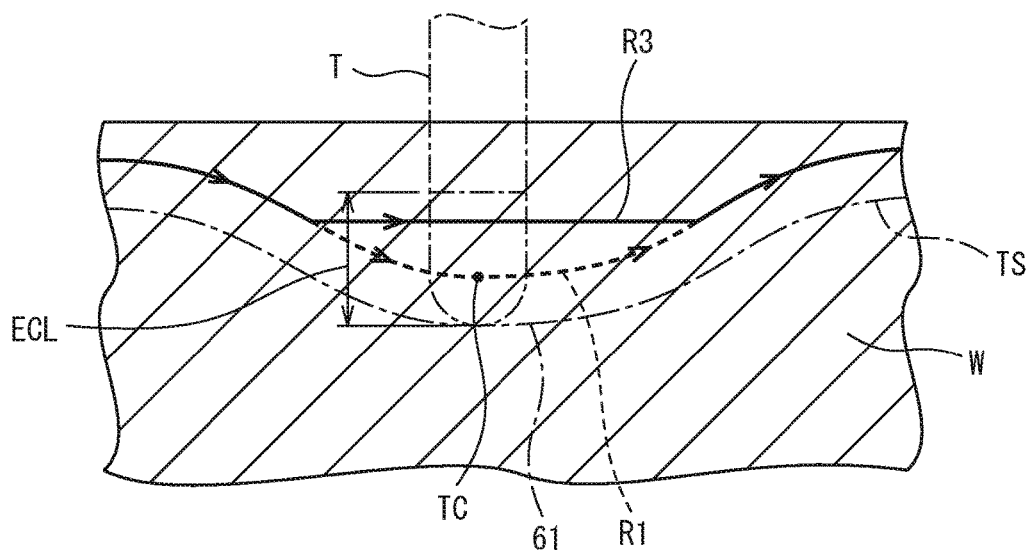
FIG. 10 is a cross sectional view of a workpiece in which a first tool path and a moved tool path are illustrated.

FIG. 10 is an enlarged schematic cross sectional view of a portion in which the concave portion is formed on the workpiece. In order to form the concave portion 61 on the workpiece W, machining may be performed through a tool path along a shape of the concave portion 61 as indicated by the first tool path R1. However, when a tool center TC of the tool T is arranged on the first tool path R1, the effective blade length ECL of the tool T is insufficient. In the insufficient region in which the effective blade length ECL of the tool T is insufficient, the first tool path R1 is moved in the axis direction of the tool T to generate the moved tool path R3.

Figure 11:
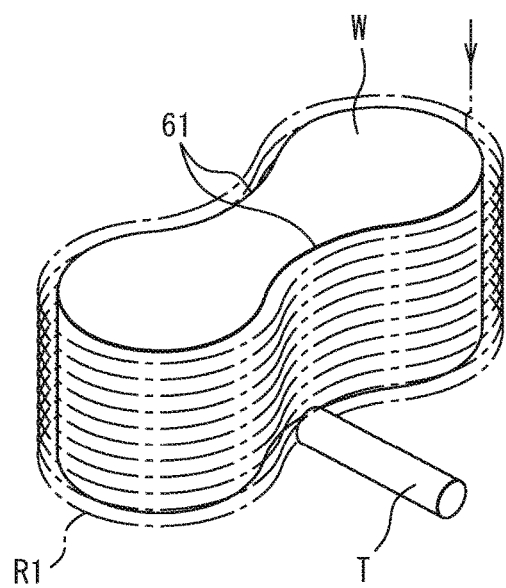
FIG. 11 is a perspective view of a workpiece having a target shape and a first tool path.
Figure 12:
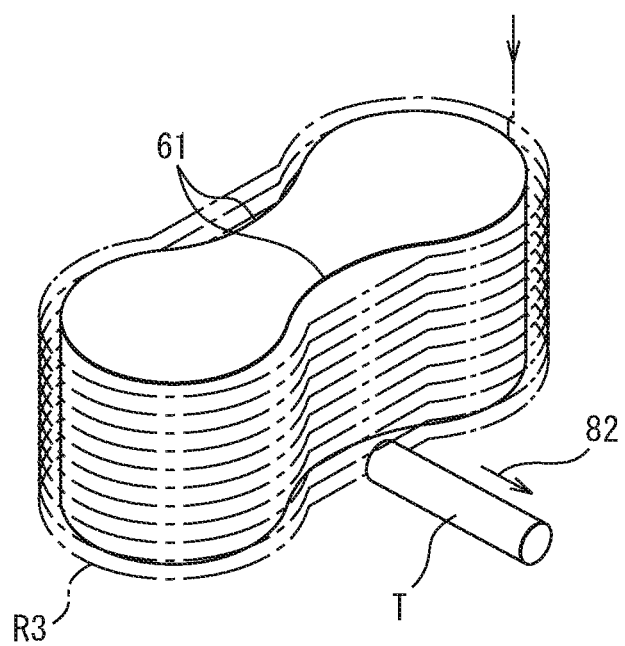
FIG. 12 is a perspective view of a workpiece having a target shape and a moved tool path.

FIG. 11 is a schematic perspective view of the workpiece and the first tool path. FIG. 12 is a schematic perspective view of the workpiece and the moved tool path. The workpieces W illustrated in FIG. 11 and FIG. 12 are machined to the target shape. As illustrated in FIG. 11, a path in which movement in a circumferential direction along the target shape of the workpiece W is repeated for a plurality of times is generated as the first tool path R1. However, as described above, the effective blade length ECL of the tool T is insufficient at the concave portion 61. Thus, as illustrated in FIG. 12, on the moved tool path R3, a path in which the tool T is moved to the axis direction is set in a region in which the concave portion 61 is formed.

When cutting is performed through the moved tool path R3, an uncut portion is generated at a portion corresponding to the concave portion 61 of the workpiece W. In order to cut the uncut portion, an entire path of the first tool path R1 can be set as illustrated in FIG. 11. However, the tool path is set at a portion which is already cut to the target shape. Thus, a tool path can be generated while excluding a portion already cut to the target shape.

Figure 13:
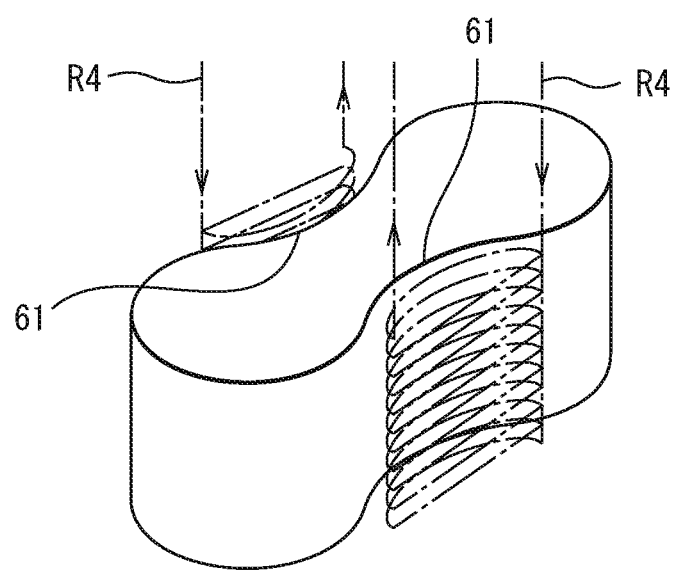
FIG. 13 is a perspective view of a workpiece having a target shape and a tool path corresponding to an uncut portion.

FIG. 13 is a schematic perspective view of the workpiece and the tool path corresponding to the uncut portion. The workpiece W illustrated in FIG. 13 is machined to the target shape. In the example illustrated in FIG. 13, tool paths R4 corresponding to the uncut portions are generated. The tool path R4 corresponds to a partial path of the first tool path R1 obtained by extracting the tool path in the region of the uncut portion from the first tool path R1. As described above, the tool path corresponding to the uncut portion is generated, and thus a machining time of the uncut portion can be shortened.

The tool path generation method and the tool path generation device of the present embodiment generate the tool paths in consideration of the effective blade length of the tool, so that, even when machining cannot be performed at one time since a portion to be cut is long, machining can be performed without removing an excess portion of a workpiece in advance. Further, it can avoid operations such as generation of the tool path for removing an excess portion, confirmation of the generated tool path, and regeneration of the tool path, and the tool path can be generated in a short time. Furthermore, generation of the tool path can be automated, and the tool path can be easily generated.

According to the present embodiment, when an auxiliary tool path for machining an uncut portion is generated, if it is impossible to perform machining through the first tool path, generation of a moved tool path is repeated by moving the tool path in the axis direction of the tool. As described above, generation of a tool path is repeated by the similar method, so that the tool path generation method can be simplified.

According to the present embodiment, in generation of an auxiliary tool path, the first tool path is selected when machining can be performed through the first tool path. As described above, a tool path is generated based on the first tool path, however, an arbitrary path through which an uncut portion can be removed can be set as the auxiliary tool path without being limited to the embodiment. For example, the auxiliary tool path may be generated by setting an upper limit of a depth to be cut in advance and setting a cutting depth from a surface of a workpiece.

In the generation of the moved tool path of the present embodiment, the moved tool path is generated by moving the first tool path to a direction apart in the axis direction of the tool. By adopting the method, a tool can be suppressed from interfering with a workpiece and a component of the machine tool. For example, the tool path is moved in a direction different from the axis direction of the tool, a tool holder may come into contact with a part of a workpiece. Since the tool is moved in the axis direction of the tool with respect to a workpiece, such interference between a part of the machine tool and the workpiece can be suppressed. In the movement of the tool path, an inclination angle of a tool with respect to a workpiece may be changed other than the movement of a movement point without being limited to the above-described embodiment.

In the tool path generation method and the tool path generation device of the present embodiment, a tool path is changed according to a method determined in advance. Thus, a moved tool path may include an undesirable path. For example, a moved tool path may include a path in which an advancing direction of the tool is greatly changed or a bending path. According to the present embodiment, in such a case, a moved tool path is corrected, and a corrected tool path is generated.

Figure 14:
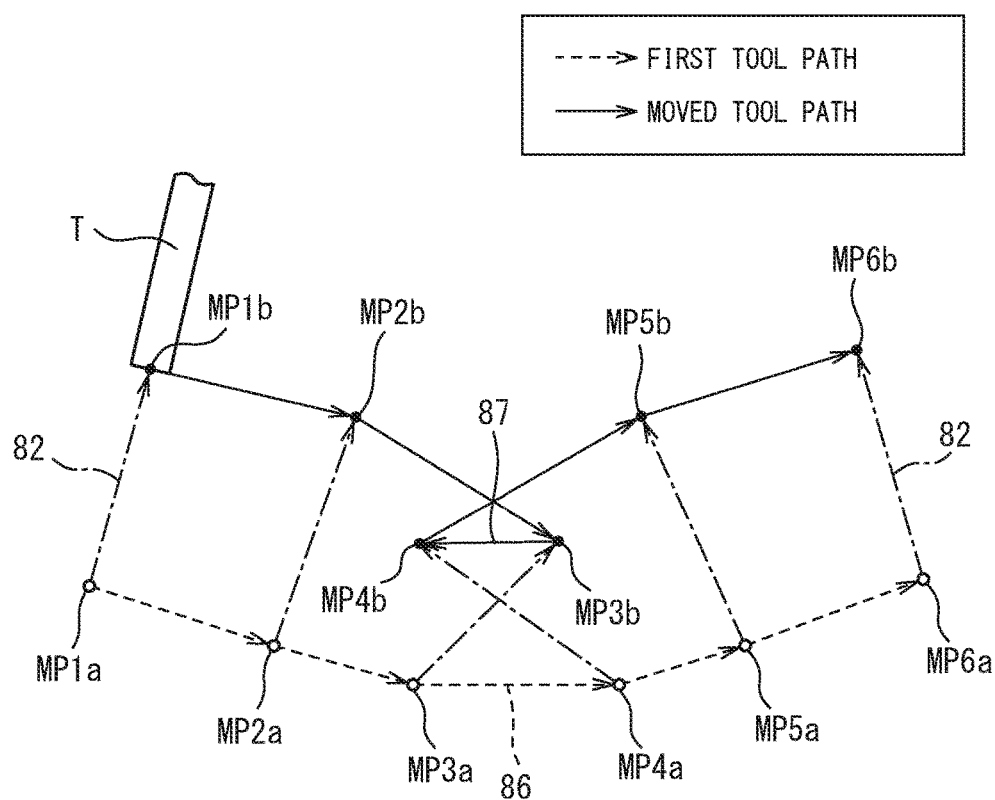
FIG. 14 illustrates a first tool path and a moved tool path.

FIG. 14 is a schematic view of the moved tool path in which the advancing direction of the tool is greatly changed. Each tool path is indicated by movement points and an arrow. The first tool path includes movement points MP1a to MP6a.

The effective blade length of the tool is insufficient with respect to the first tool path, and the moved tool path is set. As indicated by an arrow 82, the movement points MP1a to MP6a respectively move to movement points MP1b to MP6b by movement of the axis direction of the tool T.

In the present embodiment, the movement point MP3a of the first tool path is moved to the movement point MP3b. The movement point MP4a of the first tool path is moved to the movement point MP4b. In a path from the movement point MP3a to the movement point MP4a, the inclination angle of the tool with respect to the workpiece is greatly changed. The advancing direction of the tool with respect to the workpiece when moving from the movement point MP3a to the movement point MP4a is indicated by an arrow 86. Further, the advancing direction of the tool with respect to the workpiece when moving from the movement point MP3b to the movement point MP4b is indicated by an arrow 87.

Figure 15:
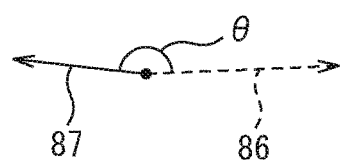
FIG. 15 illustrates an advancing direction of a tool on a first tool path and an advancing direction of the tool on a moved tool path.

FIG. 15 is a schematic view illustrating the advancing direction of the tool in the first tool path and the advancing direction of the tool in the moved tool path. The arrows indicating the advancing directions regarding the movement points MP3a, MP4a, MP3b, and MP4b in FIG. 14 are extracted. With reference to FIG. 14 and FIG. 15, the advancing direction of the tool in the first tool path is indicated by the arrow 86. Further, the advancing direction of the tool in the moved tool path is indicated by the arrow 87. It can be understood that the advancing direction of the tool indicated by the arrow 86 and the advancing direction of the tool indicated by the arrow 87 are substantially opposite. In other words, the advancing direction of the tool is reversed. There is a problem that, when the advancing direction of the tool to a workpiece is drastically changed, large acceleration occurs, and an excess force is applied to the machine tool. Alternatively, there is a possibility of lowering the machining accuracy.

According to the present embodiment, when the advancing direction of the tool in the moved tool path is drastically changed with respect to the advancing direction of the tool in the first tool path, the moved tool path is corrected. According to the present embodiment, it is judged whether or not a specific path exists in which an angle θ indicating a change in the advancing direction of the tool is equal to or greater than a judgement angle. According to the present embodiment, the judgement angle is set to 90°. When the specific path exists in which the advancing direction of the tool is changed in 90° or more, correction is performed for excluding movement points corresponding to the specific path.

In the examples illustrated in FIG. 14 and FIG. 15, the advancing direction of the tool is changed more than 90° in the movement from the movement point MP3b to the movement point MP4b in the moved tool path. Thus, the path indicated by the arrow 87 can be judged as the specific path.

Figure 16:
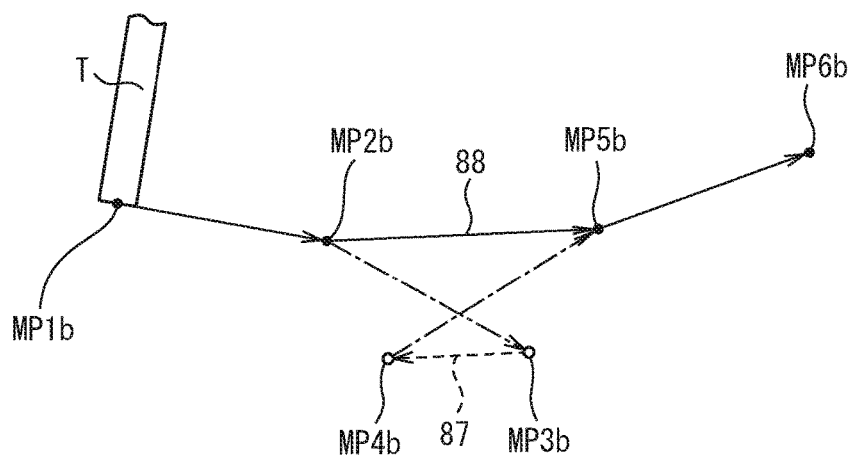
FIG. 16 illustrates a moved tool path and a corrected tool path.

FIG. 16 is a schematic view illustrating correction of the moved tool path. The movement points corresponding to the specific path include the movement point MP3b which is a start point of the arrow 87 and the movement point MP4b which is an end point of the arrow 87. Thus, the movement point MP3b and the movement point MP4b are excluded. Then, as indicated by an arrow 88, a path short-circuiting the movement point MP2b and the movement point MP5b is generated. A path including the movement points MP1b, MP2b, MP5b, and MP6b corresponds to the corrected tool path. Interference check is performed on the short-circuited path, and when it is judged that the interference occurs based on the interference check, the movement point MP3b and the movement point MP4b are not excluded.

As described above, a path in which the advancing direction is drastically changed can be excluded from the moved tool path. By this method, a drastic change in the advancing direction of the tool with respect to a workpiece can be avoided, and a burden on the machine tool can be suppressed. In addition, the machining accuracy can be suppressed from lowering.

Figure 17:
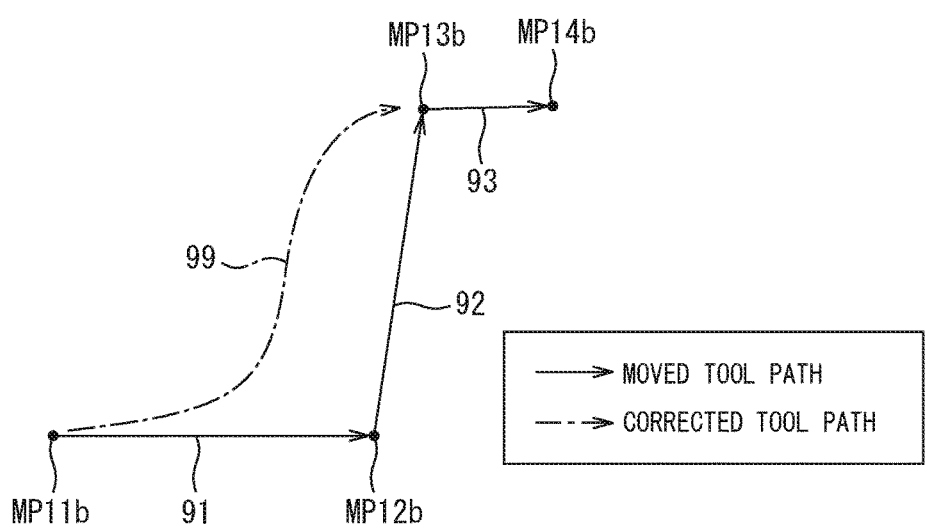
FIG. 17 illustrates a moved tool path and another corrected tool path.

Next, another correction method of the moved tool path is described. FIG. 17 is a schematic view of the moved tool path in which the tool path is bent. In the example illustrated in FIG. 17, the movement points MP11b to MP14b are indicated. The moved tool path is indicated by arrows 91, 92 and 93. The moved tool path travels to a direction indicated by the arrow 91 and then travels to a direction indicated by the arrow 92. At that time, the moved tool path is bent. In other words, the tool path is bent. The tool path is also bent when traveling to a direction indicated by the arrow 92 and then traveling to a direction indicated by the arrow 93.

In the other correction method, it is judged whether or not a bending path is included in the moved tool path. It is judged whether or not an angular portion is included in the moved tool path. When the bending path is included in the moved tool path, correction is performed for changing the bending path to a curved path. In the example in FIG. 17, the bending tool path indicated by the arrows 91, 92, and 93 is corrected to a curved tool path indicated by arrows 99 and 93. A path bending toward the outside of the workpiece is changed to a concave curve path. A path bending toward the inside of the workpiece is changed to a convex curve path. In other words, the path is changed so that the corrected tool path is placed on the outside of the moved tool path with respect to the workpiece. The path indicated by the arrow 99 corresponds to the corrected tool path.

Figure 18:
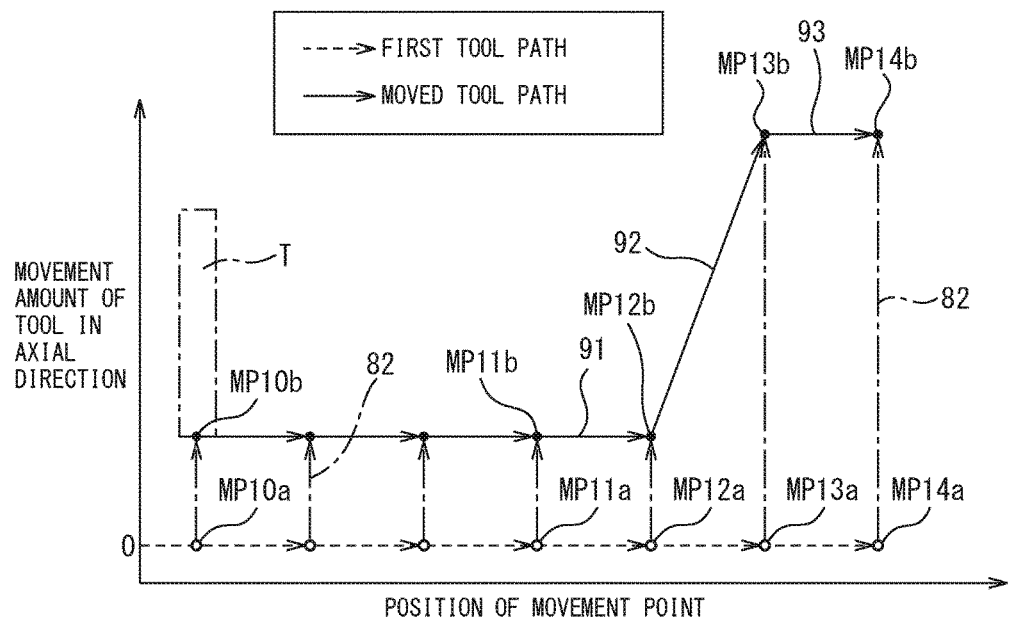
FIG. 18 is a graph indicating a movement amount of a tool in an axial direction with respect to a position of a movement point.

FIG. 18 is a graph indicating a movement amount of the tool in the axial direction with respect to a position of the movement point. In this embodiment, the moved tool path is generated by moving the first tool path as indicated by the arrows 82. The first tool path includes the movement points MP10a to MP14a. The moved tool path includes the movement points MP10b to MP14b. The tool path indicated by the arrow 92 is bent with respect to the tool path indicated by the arrow 91. The tool path indicated by the arrow 93 is bent with respect to the tool path indicated by the arrow 92. The movement point MP12b and the movement point MP13b are bending points. Thus, the tool path from the movement point MP11b to the movement point MP13b is corrected.

Figure 19:
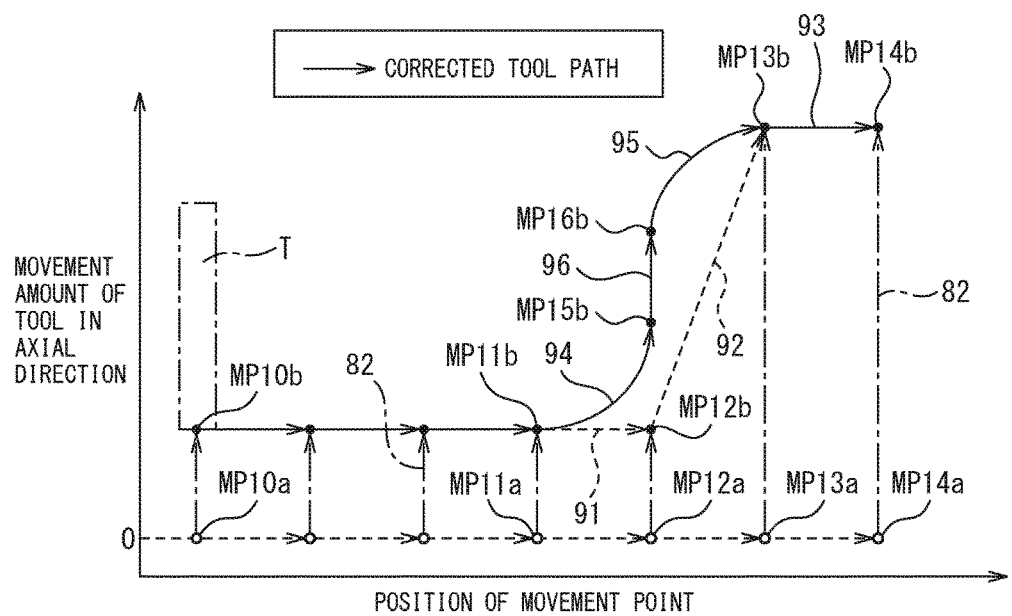
FIG. 19 is a graph indicating a corrected movement amount of a tool in an axial direction with respect to a position of a movement point.

FIG. 19 is a graph indicating the corrected tool path obtained by correcting the moved tool path. The tool path indicated by the arrow 92 in which the movement point MP13b is the bending point is corrected to a convex arc tool path. As indicated by an arrow 95, an arc tool path is generated so as to pass through the movement point MP13b. The tool path indicated by the arrow 91 in which the movement point MP12b is the bending point is corrected to a concave arc tool path. Accordingly, movement point MP15b and movement point MP16b are newly generated. Further, as indicated by an arrow 96, a tool path from the movement point MP15b to the movement point MP16b is generated.

A user can set an arbitrary value to a diameter of a circular arc when the corrected tool path is generated. For example, a diameter of an arc indicated by an arrow 94 and a diameter of an arc indicated by the arrow 95 can be set to the same as the tool diameter.

Next, regarding each corrected movement point, a corrected movement amount of the tool in the axial direction is stored. Each movement point is moved by the stored movement amount in the axis direction of the tool T, and the movement point of the corrected tool path is generated.

Positions of the movement point MP15b and the movement point MP16b which are newly generated by the correction can be set, for example, by interpolating the movement point MP11b and the movement point MP13b.

As described above, the corrected tool path can be generated by the other correction method. The movement amount of the tool in the axial direction is corrected, and thus the bending path can be changed to the curved path. A drastic change in the advancing direction of the tool with respect to a workpiece can be avoided, and a burden on the machine tool can be suppressed. In addition, the machining accuracy can be suppressed from lowering. When correction of the bending path to the curved path makes a change in the advancing direction of the tool larger, the tool path is not corrected.

FIG. 20 is a flowchart of a method for correcting the moved tool path according to the present embodiment. The method can be performed as, for example, step S105 for generating the moved tool path in FIG. 7. In step S201, the moved tool path is generated by being moved in the axis direction of the tool.

Next, in step S202, it is judged whether or not the specific path exists in which the advancing direction of the tool in the moved tool path is changed equal to or more than 90°. In step S202, when the specific path does not exist, the control is shifted to step S204. In step S202, when the specific path exists, the control is shifted to step S203. In step S203, the movement points corresponding to the specific path are deleted.

Next, in step S204, it is judged whether or not the moved tool path includes a bending portion. In step S204, when the tool path does not include the bending portion, the correction of the moved tool path is terminated. In step S204, when the tool path includes the bending portion, the control is shifted to step S205.

In step S205, the bending path is corrected to the curved path. Then, the correction of the moved tool path is terminated. For example, the control is shifted to step S106 of the flowchart in FIG. 7.

FIG. 21 is a block diagram illustrating a second machining system according to the present embodiment. In the second machining system, the machine tool 40 has a function of changing a tool path of the above-described CAM device 20. The numerical control device 50 of the machine tool 40 includes the machining program change unit 30. In the second machining system, the machining program change unit 30 functions as the tool path generation device. A tool path included in the first machining program output from the CAM device 20 corresponds to the first tool path.

The numerical control device 50 includes the input unit 31, the judgement unit 33a, and the tool path change unit 35. The input unit 31 obtains the first tool path by reading the first machining program P1. When the effective blade length is insufficient in the first tool path, the second tool path including the moved tool path is generated, and the second machining program P2 is output. The display unit 34 in the second machining system is disposed on the machine tool 40 and displays a judgement result of the judgement unit 33a and the like.

The numerical control device 50 includes a reading and interpretation unit 51, an interpolation calculation unit 52, and the servomotor control unit 53. The reading and interpretation unit 51 reads the second machining program P2 and transmits a movement command to the interpolation calculation unit 52. The interpolation calculation unit 52 calculates a position command of each interpolation period and transmits the position command to the servomotor control unit 53. The servomotor control unit 53 calculates a movement amount of each moving axis based on the position command and drives the individual axis servomotor S.

The machine tool including the above-described machining program change unit can perform machining without removing an excess portion of a workpiece in advance. Further, it can avoid operations such as generation of the tool path for removing an excess portion, confirmation of the generated tool path, and regeneration of the tool path, and the tool path can be generated in a short time. Furthermore, the tool path can be easily generated.

According to the present embodiment, the machine tool including five axes is described as an example, however, an arbitrary machine tool in which a tool is moved relative to a workpiece can be used without being limited to the present embodiment. For example, the present invention can be applied to a triaxial machine tool including three linear motion axes.

In each of control and methods described above, the order of steps can be appropriately changed within a range not changing functions and operations. In the drawings described above, same or corresponding portions are denoted by the same reference numerals. The embodiments described above are merely examples and not intended to limit the scope of the present invention. Further, the embodiments may include modification within the scope of the present invention.

REFERENCE SIGNS LIST

20 CAM device
30 machining program change unit
31 input unit
33a, 33b judgement unit
35 tool path change unit
36a, 36b estimation unit
37a, 37b moved path generation unit
38 auxiliary path generation unit
39 program generation unit
40 machine tool
50 numerical control device
51 reading and interpretation unit
52 interpolation calculation unit
53 servomotor control unit
R1 first tool path
R2 second tool path
R3 moved tool path
D1 target shape data
D2 initial shape data
D3 tool shape data
P1 first machining program
P2 second machining program
T tool
CP blade part
W workpiece
TS target shape
ECL effective blade length
MP1b to MP6b movement point

The invention claimed is:

1. A tool path generation method for generating a tool path for machining a workpiece by a machine tool, wherein a first tool path for machining the workpiece is set in advance, the tool path generation method comprising:
a judgement step for judging whether or not an effective blade length of a tool is insufficient when machining is performed through the first tool path based on the first tool path and a shape of the workpiece;

an estimation step for estimating an insufficient portion of the first tool path, in which the effective blade length is insufficient when the effective blade length of the tool is insufficient in the judgement step;

a moved path generation step for generating a moved tool path by moving a path of the insufficient portion to a path through which machining can be performed by a portion of the effective blade length with respect to the first tool path; and an auxiliary path generation step for generating an auxiliary tool path for machining an uncut portion by the tool, the uncut portion remaining on the workpiece after machining is performed through the moved tool path.

2. The tool path generation method according to claim 1, wherein the moved path generation step includes a step for generating the moved tool path by moving the first tool path in a direction in which the tool is relatively apart in an axis direction of the tool with respect to the workpiece.

3. The tool path generation method according to claim 1, wherein the auxiliary path generation step includes the judgement step, the estimation step, and the moved path generation step, the judgement step includes a step for selecting the first tool path when machining can be performed by the portion of the effective blade length of the tool, and the auxiliary path generation step includes a step for generating the moved tool path by repeating the judgement step, the estimation step, and the moved path generation step until machining can be performed by the portion of the effective blade length of the tool when the workpiece is machined through the first tool path in the judgement step and a step for generating the auxiliary tool path including the moved tool path and the first tool path.

4. The tool path generation method according to claim 1, wherein the first tool path and the moved tool path are constituted by paths for moving a plurality of movement points, and the moved path generation step includes a step for judging whether or not a specific path exists in which an advancing direction of the tool in the moved tool path is changed by an angle equal to or more than a judgement angle with respect to an advancing direction of the tool in the first tool path, and a step for excluding the movement points corresponding to the specific path from the moved tool path when the specific path exists.

5. The tool path generation method according to claim 1, wherein the moved path generation step includes a step for judging whether or not a bending path is included in the moved tool path, and a step for changing the bending path to a curved path when the bending path is included.

6. A tool path generation device including a software program stored on a non-transitory medium for generating a machining program including a tool path for machining a workpiece, wherein a first tool path for machining the workpiece is set in advance, the software program, when executed by a computer, performing the steps comprising:

judging whether or not an effective blade length of a tool is insufficient when machining is performed through the first tool path based on the first tool path and a shape of the workpiece;

when the effective blade length of the tool is insufficient, estimating an insufficient portion of the first tool path, in which the effective blade length is insufficient;

generating a moved tool path by moving a path of the insufficient portion to a path through which machining can be performed by a portion of the effective blade length with respect to the first tool path;

generating an auxiliary tool path for machining an uncut portion by the tool, the uncut portion remaining on the workpiece after machining is performed through the moved tool path; and generating a machining program in which a second tool path is set based on the moved tool path and the auxiliary tool path.

7. The tool path generation device according to claim 6, wherein in the step of generating the moved path a tool path is generated by moving the first tool path in a direction in which the tool is relatively apart in an axis direction of the tool with respect to the workpiece.

8. The tool path generation device according to claim 6, wherein the step of generating the auxiliary path includes the step of judging, the step of estimating, and the step of generating the moved path, in the step of judging the first tool path is selected when machining can be performed by the portion of the effective blade length of the tool, and in the step of generating the auxiliary path the moved tool path is generated repeatedly until machining can be performed by the portion of the effective blade length of the tool when the workpiece is machined through the first tool path in the judging step, and the auxiliary tool path including the moved tool path and the first tool path is generated.

* * * * *